United States Patent [19]
Wah Lo et al.

[11] Patent Number: 5,465,128
[45] Date of Patent: Nov. 7, 1995

[54] 2-D AND 3-D MULTI-LENS CAMERA WITH ONE LENS HAVING A WIDER PLANE THAN THE OTHER LENSES

[75] Inventors: Allen K. Wah Lo, Dunwoody; Augustine K. Wu, Norcross, both of Ga.

[73] Assignee: Image Technology International, Inc., Norcross, Ga.

[21] Appl. No.: 174,831

[22] Filed: Dec. 29, 1993

Related U.S. Application Data

[63] Continuation-in-part of Ser. No. 988,678, Dec. 10, 1992, abandoned.

[51] Int. Cl.$^6$ ................................................ G03B 35/08
[52] U.S. Cl. .................................................... 354/114
[58] Field of Search ................................ 354/114, 115, 354/116, 123, 159

[56] References Cited

U.S. PATENT DOCUMENTS

| | | | |
|---|---|---|---|
| 3,895,867 | 7/1975 | Lo et al. | 355/77 |
| 3,953,869 | 4/1976 | Lo et al. | 354/115 |
| 3,960,563 | 5/1976 | Lo et al. | 354/114 X |
| 4,037,950 | 7/1977 | Lo et al. | 352/58 |
| 4,086,585 | 4/1978 | Lo et al. | 354/114 |
| 4,107,711 | 8/1978 | Law | 354/112 |
| 4,120,562 | 10/1978 | Lo et al. | 359/462 |
| 4,166,684 | 9/1979 | Law | 354/112 |
| 4,475,798 | 10/1984 | Smith et al. | 354/114 |
| 4,724,449 | 9/1988 | Wright | 354/112 |
| 4,943,825 | 7/1990 | Taniguchi et al. | 354/106 X |
| 5,294,951 | 3/1994 | Lo | 354/114 X |

*Primary Examiner*—Howard B. Blankenship
*Attorney, Agent, or Firm*—Harold L. Marquis; Deveau, Colton & Marquis

[57] ABSTRACT

The present invention relates to a multi-lens camera that can be used for taking three-dimensional and two-dimensional photographs. The multi-lens camera is constructed so that it is capable of exposing a series of 2-D images of a scene onto the photographic film corresponding to the number of lenses of the camera. The multi-lens camera of this invention has a film plane for one of the lenses which is from 1.5 to 4 times wider than the film plane behind the other lenses. Baffles are used to optically separate the film planes behind the lenses. In a preferred embodiment, the wider film plane is a full frame (e.g., 35 mm) and the other film planes one-half frame. The wider film plane results in a broader field of view of a scene for producing a normal or panorama 2-D print. The multiple images of the scene exposed by the camera can be used for producing a conventional 2-D print.

7 Claims, 9 Drawing Sheets

2-D AND 3-D MULTI-LENS CAMERA WITH ONE LENS HAVING A WIDER PLANE THAN THE OTHER LENSES

This application is a Continuation-In-Part of application Ser. No. 07/988,678 and filed on Dec. 10, 1992 abandoned.

FIELD OF THE INVENTION

The present invention relates to a camera that can be utilized for both three-dimensional photography and two-dimensional photography.

PRIOR ART

In lenticular type three-dimensional (3-D)photography, a plurality of two-dimensional (2-D) views of the scene are taken from a number of horizontally-spaced vantage points, and the series of 2-D images is then compressed and printed at the focal plane of each of the lenticules of the lenticular screen to form a 3-D composite image of the field.

In order to take a series of 2-D images at a number of vantage points, one generally takes one of two approaches: 1) using a single-lens camera to take one image at a time at each of the vantage points, or 2) using a multi-lens camera to simultaneously capture a series of 2-D views at one snap. Because the first approach requires special equipment which is usually expensive and bulky, a second approach is more practical for consumer uses.

Multi-lens cameras have been disclosed in a number of U.S. patents which include U.S. Pat. No. 4,8000,407 (Lo) where the invention of a3-D camera with three lenses is disclosed, and U.S. Des. Pat. No. 264,343 (Che) where the invention of 3-D cameras with four lenses is disclosed. Multi-lens cameras are currently available on the market.

Multi-lens cameras are also disclosed in U.S. Pat. Nos. 3,953,869 (Lo, et al.), 4,037,950 (Lo, et al.), 4,724,449 (Wright) and 4,475,798 (Smith, et al.).

BACKGROUND OF THE INVENTION

The multiple images exposed by a multi-lens camera are a series of regular 2-D images of the same scene photographed at slightly different viewing angles. These regular 2-D images are necessary, as a group, for the composing of a 3-D print, but any one of them can also be used to produce conventional 2-D photographs. Logically, a multi-lens camera should be capable of being utilized as a 3-D camera or as a 2-D camera so that the consumer will not be required to have two cameras, one dedicated to 2-D picture taking and another dedicated to 3-D picture taking. However, all existing consumer 3-D multi-lens cameras adopt a half-frame negative format, and this format cannot cover the same field of view normally covered by a full-frame format used in a regular 35 mm full-frame camera.

3-D multi-lens cameras are designed to simulate the binocular vision of the human eyes. Therefore, in the design of a consumer 3-D multi-lens camera, the spacing between the two end most lenses should be kept roughly equal and not to exceed the separation distance between the eyes. This lens spacing is kept in order to assure a good 3-D effect and, at the same time, to avoid excessive parallax which causes a 3-D photograph to become out-of-focus. Since the eye separation distance of the average adult is between 63 and 70 mm, the preferred spacing between the two end most lenses in a consumer 3-D multi-lens camera should not exceed 70 mm, depending on the number of lenses on the camera.

Furthermore, the distance between lenses in a multi-lens camera is also constrained by the size of the 3-D photograph, the normal viewing distance, and the distance of objects to be photographed.

In a multi-lens camera for stereoscopic photography, the center-to-center spacing between immediately adjacent lenses must be confined to the maximum acceptable distance for good viewing. This lens spacing must be kept within a parallax range so that the composite image in the 3-D photograph does not flicker or become out of focus. As disclosed in U.S. Pat. No. 5,059,771 (Ip et al.), the desired parallax, P, is computed according to the following equation:

$$P=(2V\pi/21600)E$$

where V is the normal viewing distance of the photograph, and E is the capability of the eyes to fuse together the two images of the stereo pair, expressed in terms of arc minutes of the scanning angle of the eyes. The constant 21600 is the number of arc minutes of a full circle (i.e., 360 degrees). It has been determined by empirical observation that E ranges from 20 to 10 arc minutes depending on the illumination and the contrast of the object in the scene. The normal viewing distance of the photograph is generally dictated by the size of the 3-D photograph and the normal viewing angle of the photograph. As disclosed by Ip et al, the viewing distance is given by:

$$V=D/[\tan(\phi/2)]$$

where D is the longer dimension of the photograph and $\phi$ is the normal viewing angle which has been empirically determined to be about 15 degrees. With $\phi=15$ degrees, we have $\tan(\phi/2)=0.132$ and $$V=3.79D$$

For example, with a consumer-size 3-D photograph of 3.5"×4.5", D=4.5", D=4.5"=114.3 mm, the normal viewing distance V is approximately 12"–14" (i.e., 305 mm to 357 mm). If E is taken to be 6 arc minutes, then, with V=330 mm, we obtain $$\begin{aligned} P &= 2\times 330 \times 3.1416 \times 6/21600 \\ &= 0.576 \text{ mm} \end{aligned}$$

From this parallax value, one can calculate the required center-to-center spacing, T, between adjacent lenses according to an equation disclosed by Ip et al.:

$$T=BKP/u(B-K)$$

where u is the back focal length of the camera lens; B is the distance between the camera and background objects in the scene, and K is the distance of the key subject to be photographed. If the nearest allowable key subject distance from the camera is a 3 feet (i.e., 914 mm)and with the background so far away that B can be taken as infinity. For example, with a consumer camera that uses 30 mm lenses and a 135 film, the lens spacing is given by:

$$\begin{aligned} T &= KP/u \\ &= 914 \times 0.576/30 \\ &= 17.54 \text{ mm} \end{aligned}$$

It should be noted that T is the center-to-center distance between adjacent lenses. If we allow for a small gap (e.g. 1 mm) between adjacent image frames, then the frame itself is 16.5 mm. For a camera using 35 mm film, this is roughly half the size of a regular full-frame format.

The above calculations show that it is not practical to design a multi-lens 3-D camera that takes full-frame images on the film planes behind all of the lenses on a camera using a 35 mm film. For this reason, all existing consumer 3-D cameras adopt a half-frame format as illustrated in FIG. 1. FIG. 1 clearly illustrates that the objectives 21, 22 and 23 will form images on frames 31, 32 and 33, respectively. The image frames are optically separated by baffles so that the image frames by one objective is only incident upon the corresponding frame or film plane.

It would be very advantageous for a consumer camera to be capable of exposing multiple images for 3-D photography and also provide a larger image format for 2-D photography. With such a design, the consumer will need only one camera for both 2-D and 3-D picture taking.

SUMMARY OF THE INVENTION

It is an object of the present invention to design a multi-lens camera that is capable of exposing multiple images for 3-D photography and producing single full-frame images for 2-D photography.

The camera of the present invention is constructed with a plurality of identical lenses so that a series of 2-D images are exposed onto the film at a number of horizontally spaced vantage points at a single snap of the camera. These simultaneously exposed images are essential for producing 3-D composite photographs of the scene. The camera has a film plane behind one lens which is from 1½ to 4 times the width of the film plane behind the other lenses. Baffles are used to optically separate the film planes behind the lenses. The film exposed behind the lens with the wider film plane can be used to produce a conventional 2-D photograph.

The negative exposed by the improved multi-lens camera can be used to compose a 3-D picture or to produce a conventional full frame picture.

Because the negative exposed by the improved multi-lens camera can be used for making both 3-D and 2-D pictures, selection of the proper frame or frames on the negative will certainly add confusion to the printing process. Therefore, it is logical to incorporate a code on the film so that the printer operator can select the proper frame or a photographic printer can automatically identify the proper frame from the 2-D negatives and make proper prints accordingly. An example of such codes is illustrated in FIG. 8.

DETAILED DESCRIPTION OF THE DRAWINGS

Figure 1:
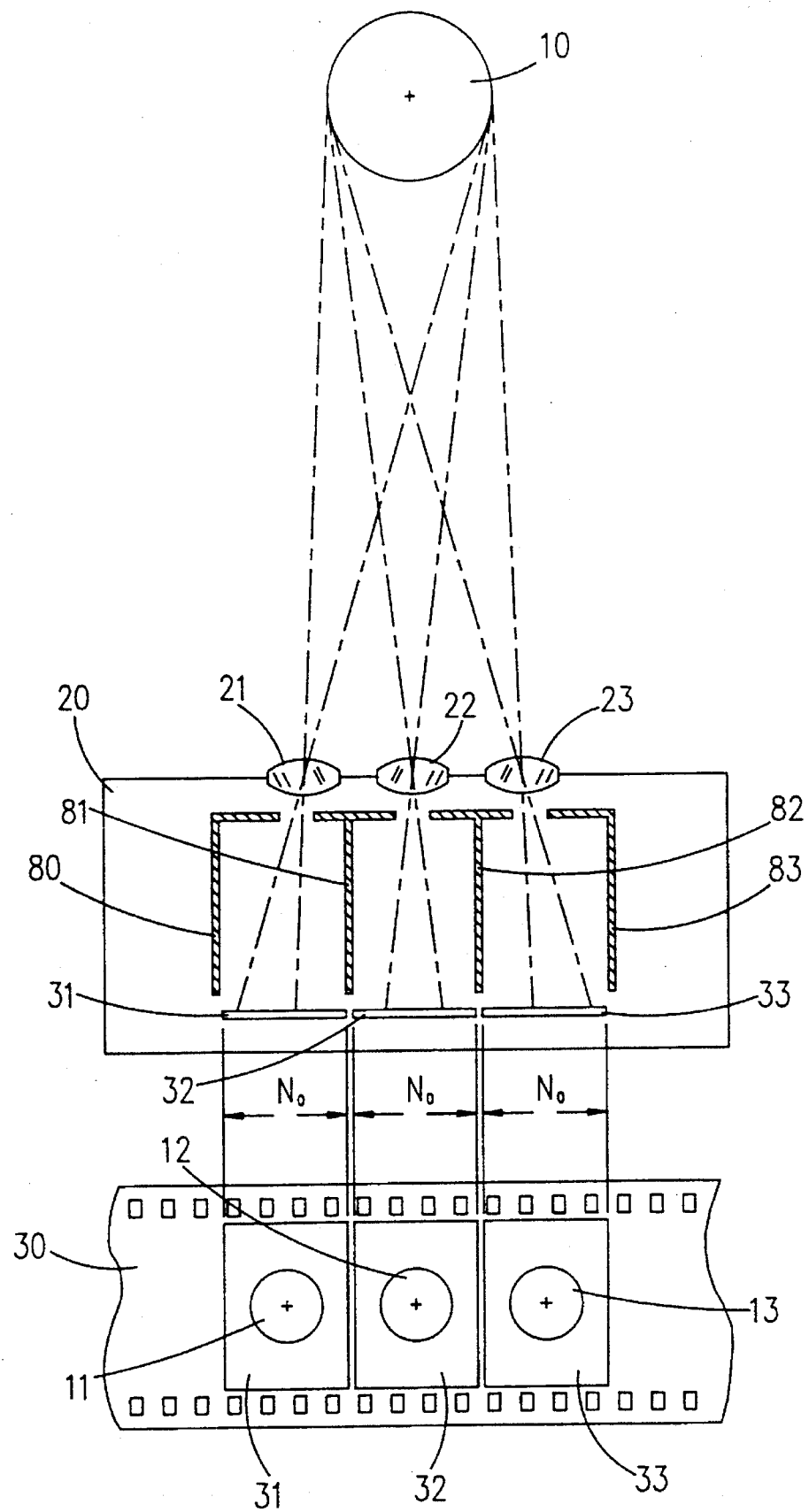
FIG. 1 is a schematic view of a prior art 3-D multi-lens camera taking a photograph of an object.

FIG. 1 illustrates a prior art three-lens camera taking a three-dimensional photograph. The camera 20 has three identical image-taking lenses 21, 22 and 23 and three identical negative frames 31, 32 and 33. The image frames are optically separated by baffles 80, 81, 82 and 83 so that images formed by lenses 21, 22, and 23 are incident upon frames 31, 32 and 33, respectively. The width of the negative frames is represented by the letters $N_o$. The key object 10 being photographed is exposed approximately at the center 11, 12 and 13 of each frame of the film 30.

Figure 2:
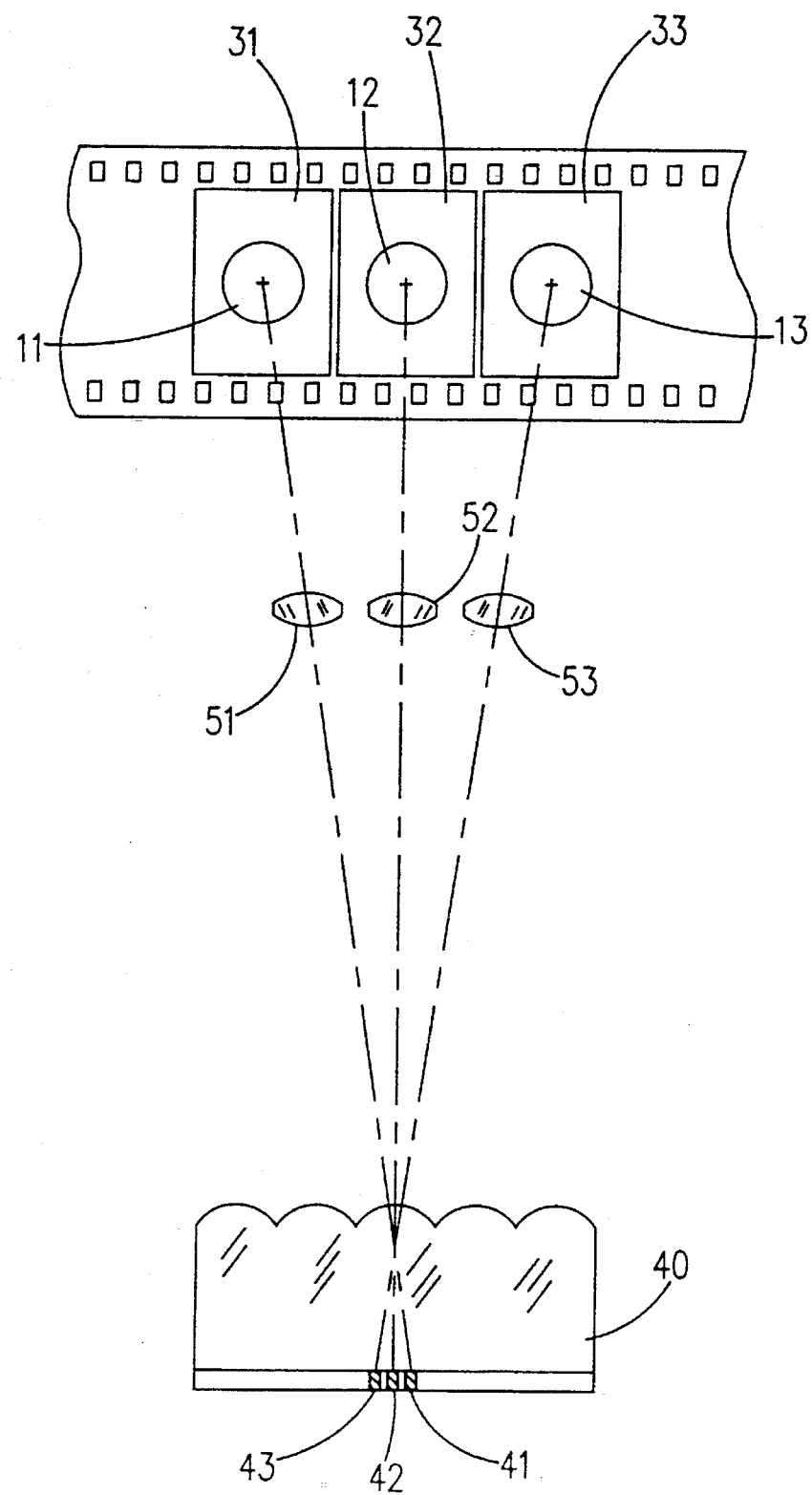
FIG. 2 is a schematic drawing showing the composition of a 3-D photograph from a negative exposed by a prior art 3-D multi-lens camera.

FIG. 2 illustrates the composition of a conventional 3-D photograph using a negative exposed by a prior art three lens camera. 2-D objects 11, 12 and 13 on negative flames 31, 32 and 33 are projected by enlarging lenses 51, 52 and 53 of the printer onto lenticular print material 40 to form three separate images 41, 42 and 43. These images can fill an entire image band but preferably each image will be projected several times onto an image band to fill all of the gaps.

Figure 3:
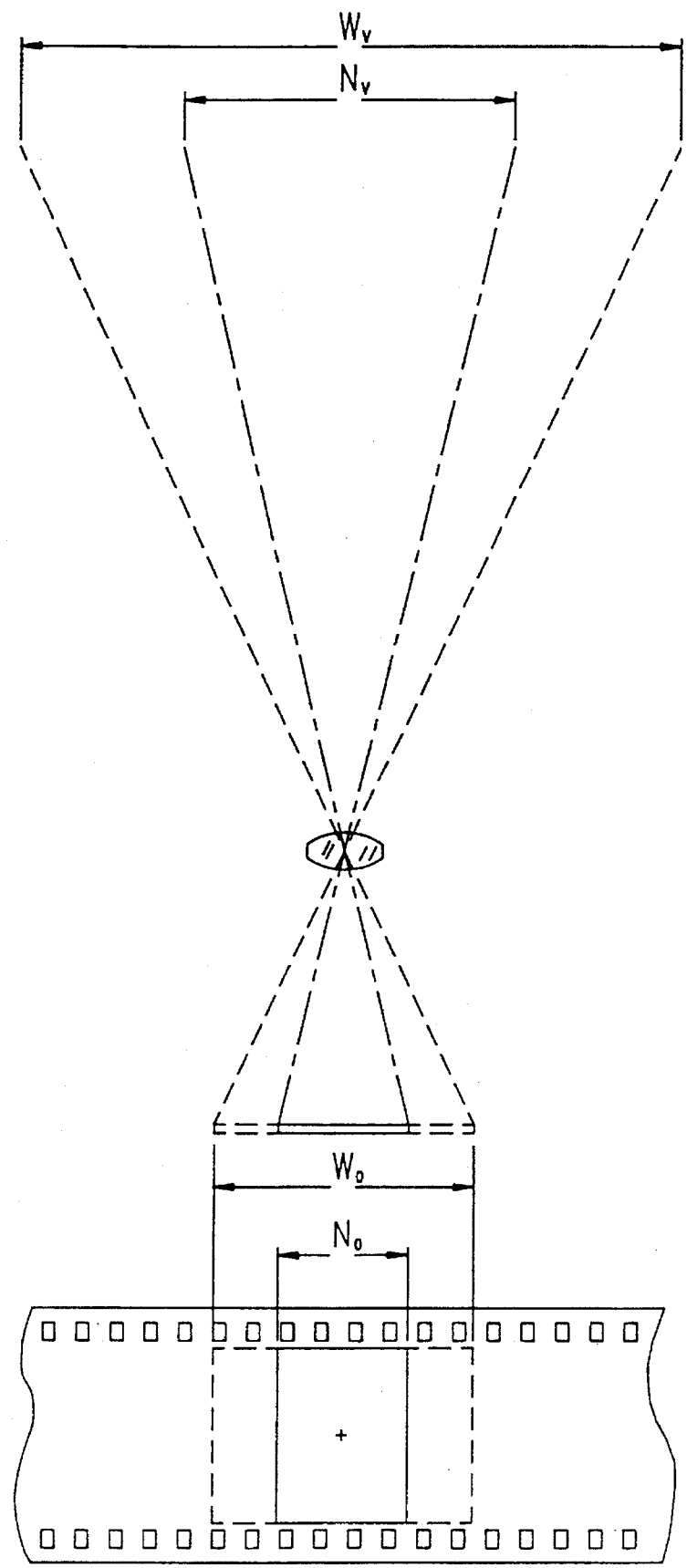
FIG. 3 is a schematic drawing showing the field of coverage of exposure of an image onto a negative of a full frame exposure compared to a half frame exposure.

FIG. 3 illustrates the width of the negative format of a conventional 3-D multi-lens camera and the different width of a full frame 2-D camera. Existing 3-D multi-lens cameras utilize 35 mm film and each image fills one-half of a 35 mm frame. This is denoted by the letters $N_o$ in FIG. 3. The view coverage of this negative format is denoted by the letters $N_v$. The width of a full frame format is denoted by the letters $W_o$ and the corresponding view coverage is denoted by $W_v$.

The camera of this invention preferably utilizes the half-frame (approximately) format on all of the lenses except one. This lens projects an image onto the negative that is 1.5 to 4 times the width of images projected by the other lens. The width of the wider film plane is illustrated by the letters $W_o$ in FIG. 3. The image projected onto the negative in the wider film plane is used to make conventional 2-D photographs. The half-frame format is not very satisfactory in terms of picture quality for producing 2-D photographs because of the narrower field coverage as illustrated in FIG. 3.

The above calculations show that it is not practical to design a 3-D camera in which all lenses take full-frame pictures on 35 mm film yet maintain a proper parallax. For this reason, all existing consumer 3-D cameras adopt a half-frame format, as illustrated in FIG. 1. FIG. 1 clearly illustrates that the objectives 21, 22, 23 will form images on frames 31, 32, 33, respectively. The image frames are optically separated by battles so that image formed by one objective is only incident upon its corresponding frame or film plane.

To allow for the different choices in film type, the size of the 3-D photograph, and the focal length of the camera lenses, a range for the image frame can be used for 2-D photographs between 1.5 to 4 times wider than the image frames to be used for 3-D photographs, instead of 2 times.

Figure 4:
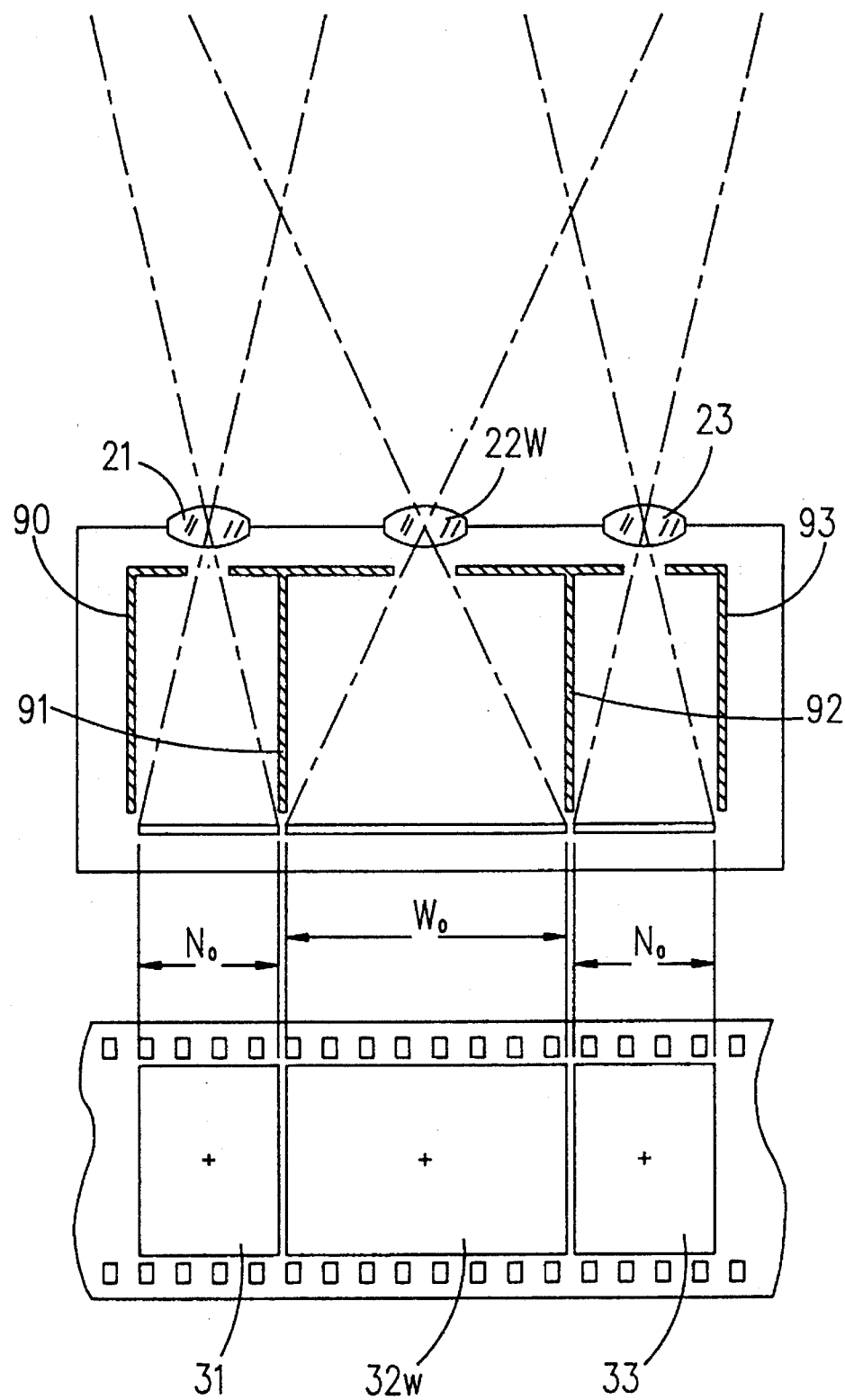
FIG. 4 is a schematic view of the 3-D multi-lens camera of this invention having two different negative formats.

FIG. 4 illustrates the two different negative formats. The frame denoted by numeral 32w is shown as having a width of a full frame $W_o$ and covers a wider field of view. The side frames denoted by numerals 31 and 33 are half-frames having a width of $N_o$. In FIG. 4, frames 31, 32w and 33 are optically separated by baffles 90, 91, 92 and 93 so that images formed by lens 21, 22w and 23 are incident upon frame 31, 32w and 33, respectively.

In the preferred embodiment, the camera forms a single full-frame image along with a number of half-frame images. The full-frame image is intended for making 2-D photographs while the half-frames and a part of the full-frame are intended for making 3-D photographs. With this design, only one of the objectives (lenses) on the camera forms a full-frame image in the film plane while all other objectives form half-frame images in the film plane.

The camera of this invention is constructed so that the lens having the wider plane is separated from the adjacent lenses by a greater distance than in a conventional 3-D camera. The precise amount of separation depends upon the type of film being used in the camera. Ideally in a 3D 35 mm camera a lens with the wider film plane will expose a full frame (i.e., 35 mm) while the other lenses will expose half a frame (i.e., 18 mm). Accordingly, the film plane for one of the lenses is ideally 2 times wider than the film plane for all other lenses. As illustrated in FIG. 4, the center objective is chosen to take the full-frame image and only the image formed by the center objective is incident upon the center film plane 32w.

Figure 9:
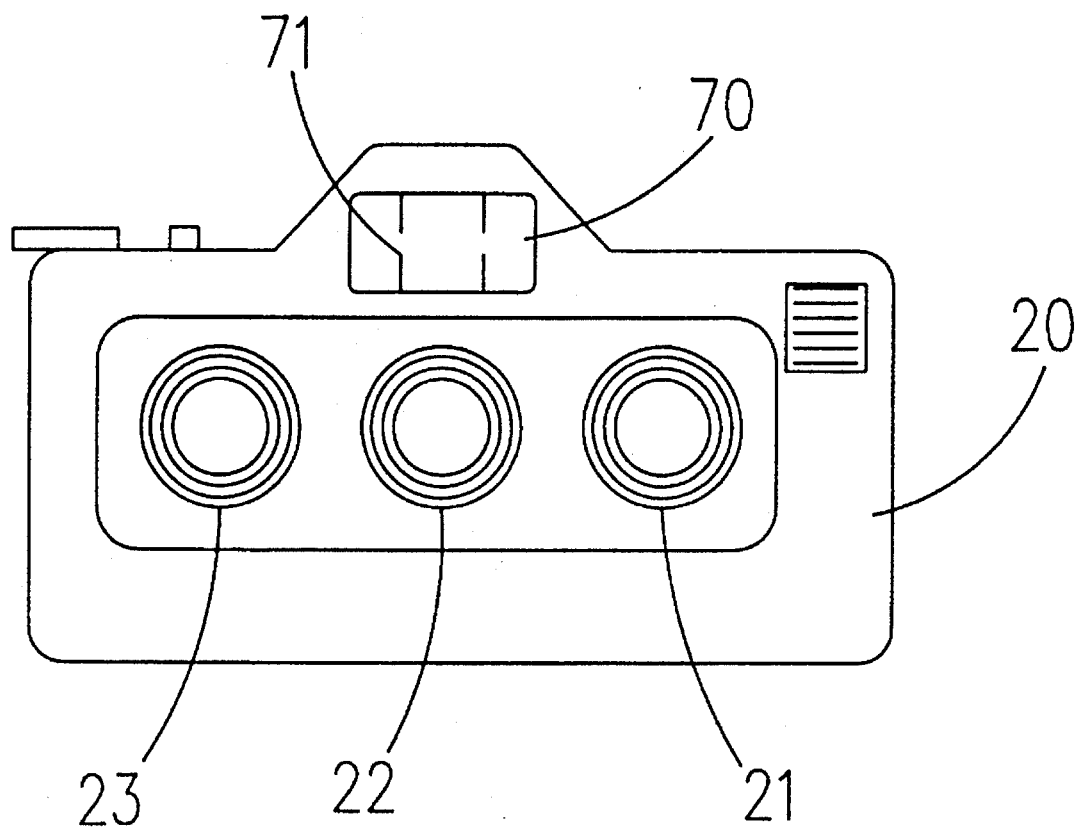
FIG. 9 is a schematic view of the 3-D multi-lens camera of this invention with a veiwfinder for both 3-D and 2-D picture taking.

As illustrated in FIG. 9, it is preferred that the camera 20 have a viewfinder 70 which is based upon the width of the wider film plane as only the negative frame of the wider film plane will be printed. In taking a 2-D picture the photographer can use the full area of the viewfinder 70 in taking the picture. When the photographer is taking a 3-D picture, it is desirable to use a viewfinder in conjunction with the narrower frame. This can be accomplished by placing lines 71 on the viewfinder that correspond to the narrower frames or alternatively two different viewfinders can be used, one for 3-D pictures and one for 2-D pictures.

It should be pointed out that when the camera is used for taking 2-D pictures, the pictures can be taken in a vertical or a horizontal position.

Figure 5:
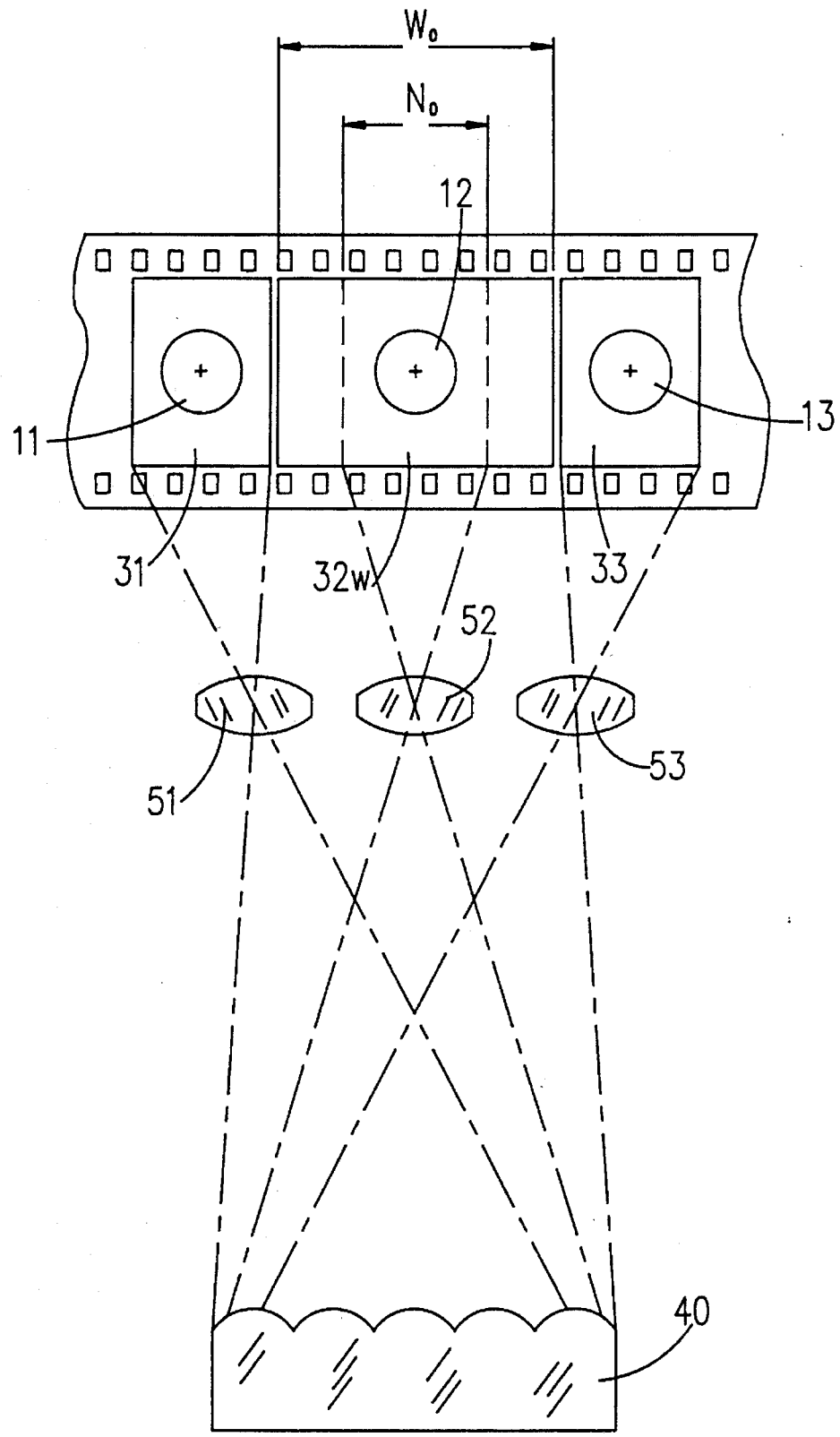
FIG. 5 is a schematic view illustrating the composition of a 3-D picture from a negative exposed by the camera of the present invention.

FIG. 5 illustrates the composition of a 3-D picture from a negative exposed by the multi-lens camera of this invention. In composing a 3-D photograph only the center half of the center frame is utilized as it is of equal width compared to the other frames. This is represented by the letters $N_o$.

As shown in FIG. 5, the key subject being photographed is exposed approximately at the center 11, 12 and 13 of frames 31, 32w and 33, respectively. The center half of frame 32w is projected through lens 52 while substantially the entire frame of frames 31 and 33 are projected through lenses 51 and 53 on the lenticular print material 40 to form a composite 3-D photograph. It should be noted that lenses 51, 52 and 53 can be a single lens but moved to different positions during printing.

Figure 6:
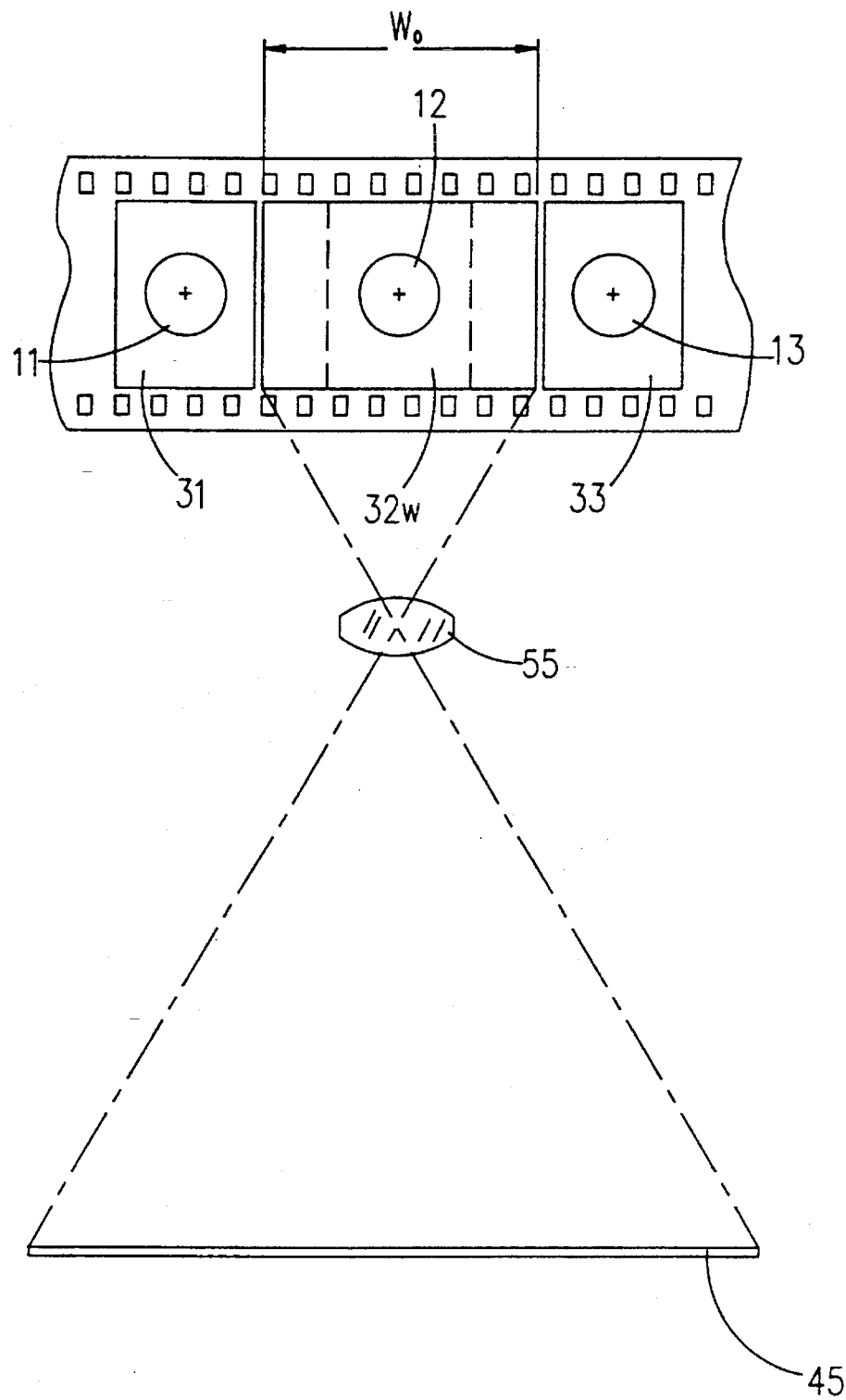
FIG. 6 is a schematic view illustrating the printing of a conventional 2-D picture from only the wider center negative frame.

FIG. 6 illustrates the printing of a conventional 2-D picture taken by the camera of this invention. When a conventional 2-D photograph is being composed, the entire frame 32w of a width $W_o$ is utilized in the printing of the picture. As shown in FIG. 6, only one image frame is projected through a lens 55 and 2-D print material 45.

It should be realized that both 2-D and 3-D photographs can be composed from a negative exposed in the camera of the present invention. For example, 2-D photographs could first be printed and then the photographer can later decide to print 3-D photographs.

Figure 7A:
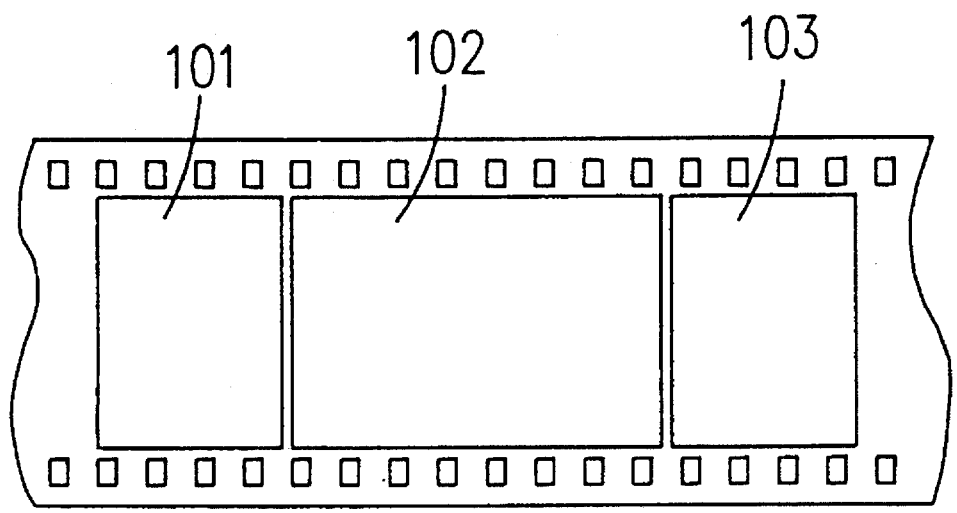
FIG. 7(a) to 7(d) are plan views of negatives illustrating different arrangements of the wider negative format.
Figure 7B:
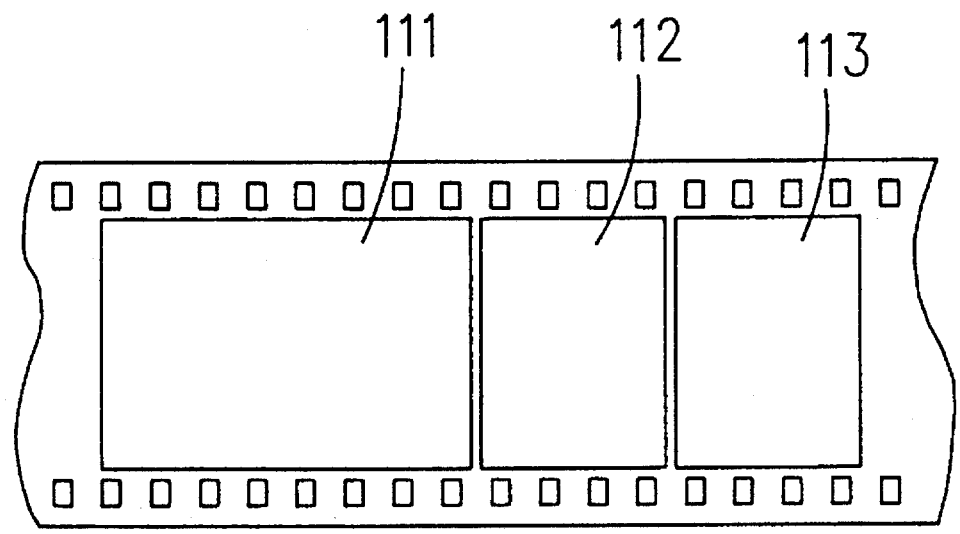
Figure 7C:
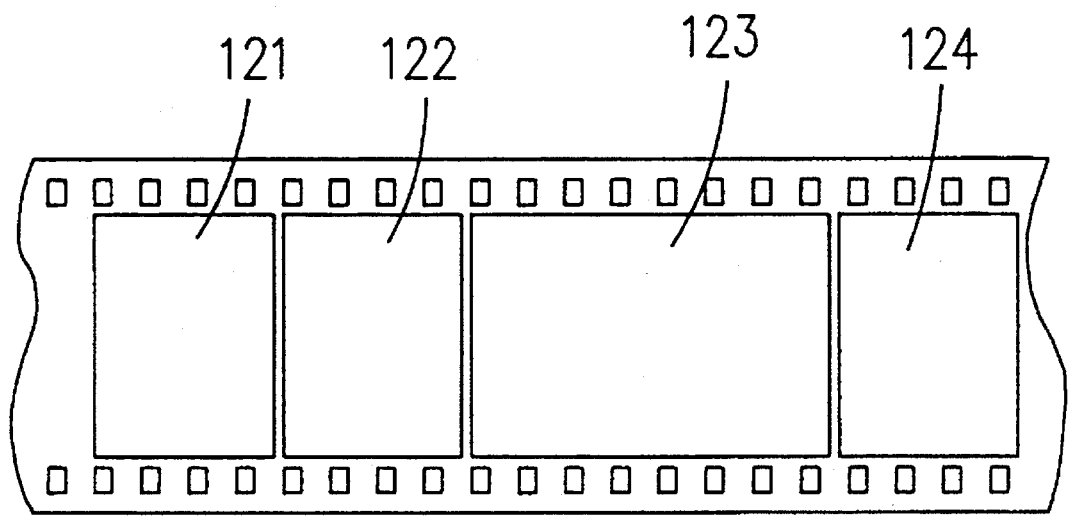
Figure 7D:
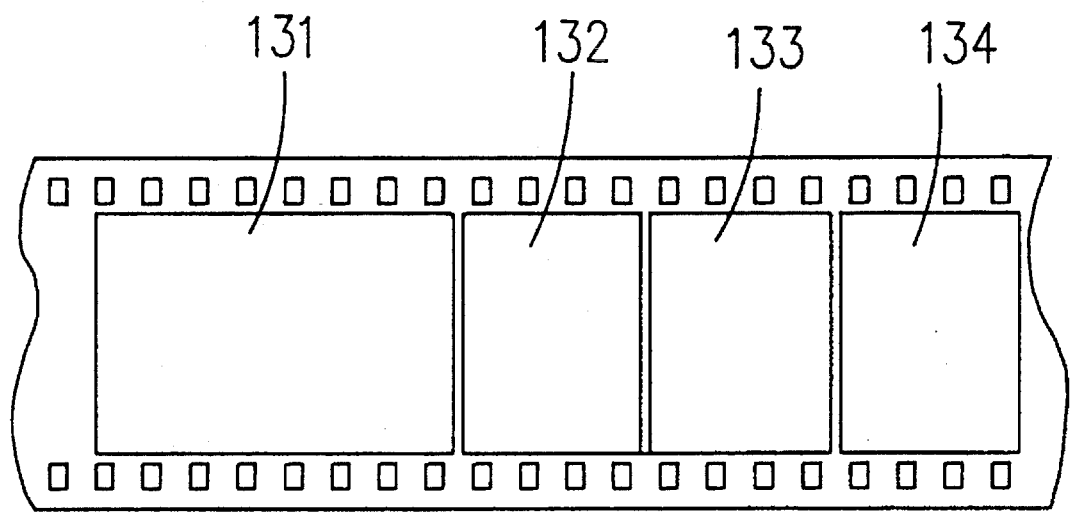

While the center lens of a three-lens camera is illustrated as having the wider film plane behind it, it can be at either end or somewhere in between as illustrated by FIGS. 7a to 7d. FIGS. 7a to 7d illustrate different negative formats. FIG. 7a illustrates a negative format in which the center frame 102 is of a wider format while side frames 101 and 103 are of a half-frame format. FIG. 7b also illustrates a negative exposed by a three-lens camera, but in this case one of the end frames is of a wider format and is denoted by numeral 111, while frames 112 and 113 are of a half-frame format. FIG. 7c illustrates the negative exposed by a four-lens camera in which the wider negative format is the second frame from the end and is denoted by numeral 123, while frames 121, 122 and 124 are of a half-frame format. FIG. 7d illustrates a negative exposed by a four-lens camera in which the wider frame is at the end and is denoted by numeral 131, while frames 132, 133 and 134 are of a half-frame format.

While the wider frame is one of the middle frames, as illustrated in FIG. 7a and FIG. 7c, then the width of wider frame can be 1.5 to 2.5 times the width of other frames. However, when the wider frame is one of the end frames, as illustrated in FIG. 7b and FIG. 7d, then the wider frame can be of a larger width and can still retain a proper parallax. Depending on the film size used by the multi-lens camera, the width of the wider end frame can be up to 4 times the width of any of the other frames. In this situation the wider frame only affects the parallax with a single adjacent frame and not two adjacent frames as when the wide frame is one of the middle frames. In the latter case the amount of parallax may be too great as the width differential exceeds 2.5.

Figure 8:
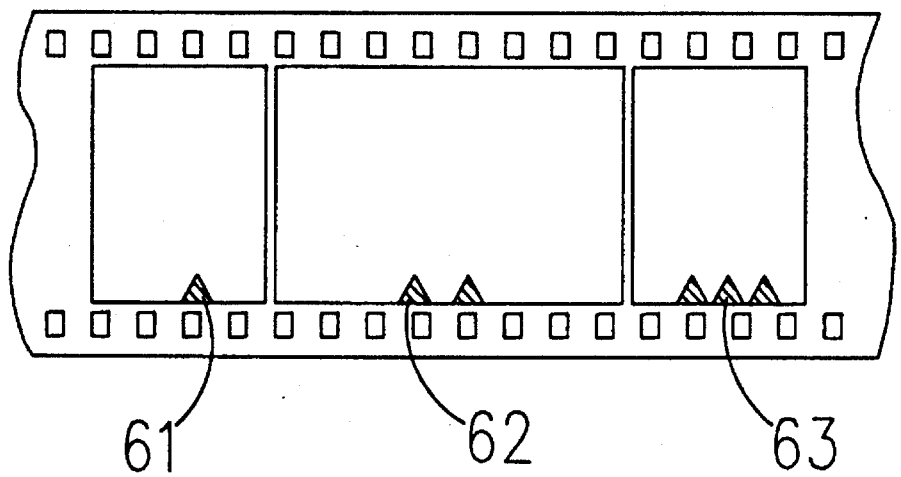
FIG. 8 is a plan view of negatives with 2-D and 3-D picture identification codes exposed on the negative.

FIG. 8 illustrates examples of 2-D and 3-D picture identification codes. The codes 61, 62 and 63 are exposed on each frame. The 2-D code 62 is exposed on the wider frame. The left-hand frame is a half frame and has a code 61 so that the printer or the printer operator can identify it. The code on the right frame also denotes a half frame. These identification codes can be exposed by apertures in the camera which are adjacent to each of the lens and are uncovered when the picture is taken. When these codes are placed on the film, they can be read by either electronic or manual means. A suitable electronic means is to use a photosensor. The use of a code is disclosed in U.S. Pat. No. 4,903,069 (Lam). The use of a code is an important feature because the selection of the proper negative to be exposed would be confusing when switching between 3-D and 2-D printing.

While the present invention has been described with reference to the preferred embodiment, it shall be understood by those skilled in the art that various changes may be made and equivalents may be substituted for elements thereof without departing from the scope of the invention.

Therefore, it is intended that the present invention shall include embodiments within the scope of the appended claims.

What is claimed is:

1. A camera for taking both two-dimensional and three-dimensional pictures, comprising a plurality of fixed picture-taking lenses, a film plane behind each lens, a set of baffles between each picture taking lens and its respective film plane, with the film plane for one of the lenses being from 1.5 to 4 times wider than the film plane behind each of the other lenses due to a corresponding difference in the width between the sets of baffles, with spacing between the lenses being determined by the width of the different film planes, with the film planes being optically separated by baffles so that the image formed by each lens is incident upon the corresponding film plane.

2. A camera for taking both two-dimensional and three-dimensional pictures, comprising a plurality of picture-taking lenses, a film plane behind each lens, a set of baffles between each picture-taking lens and its respective film plane, with the film plane behind the center lens being from 1.5 to 4 times wider than the film plane behind each of the other lenses due to a corresponding difference in the width between the sets of baffles, with spacing between the lenses being determined by the width of the different film planes, with the film planes being optically separated by baffles so that the image formed by each lens is incident upon the corresponding film plane.

3. The camera of claim 2 in which the wider film plane is a full frame in width, and the other film frames are one-half frame in width.

4. The camera of claim 2 in which the wider film plane is approximately 35 mm in width, and the other film plane are approximately 18 mm in width.

5. The camera of claim 2 which also has a viewfinder based upon the width of the wider film plane for use in taking two-dimensional pictures with lines on the viewfinder that correspond to the narrower frames for use in taking three-dimensional pictures.

6. The camera of claim 2 which has an aperture for placing a code on the film at the time the picture is taken to identify the order of the film planes which is more suitable for printing a 2-D photograph than the narrower image frames.

7. The camera of claim 2 in which the film plane behind the center lens is from 1.5 to 2.5 times wider than the film plane behind each of the other lenses.

* * * * *